United States Patent Office

3,249,621
Patented May 3, 1966

---

3,249,621
3-(2-BENZOTHIAZOLYL)-2-BENZOTHIA-ZOLINONE
Robert H. Campbell, St. Albans, Sidney T. Webster, Nitro, and John J. D'Amico, Dunbar, W. Va., assignors to Monsanto Company, St. Louis, Mo., a corporation of Delaware
No Drawing. Filed Oct. 16, 1964, Ser. No. 404,485
1 Claim. (Cl. 260—304)

This invention relates to 3-(2-benzothiazolyl)-2-benzothiazolinone which may be prepared as follows:

To a stirred solution containing 69.3 grams (0.4 mole) of anhydrous sodium 2-hydroxybenzothiazole in 300 ml. of dimethylformamide, 66 grams (0.39 mole) of 2-chlorobenzothiazole was added in one portion. The stirred solution was heated at 150° to 160° C. for a period of 5 hours. After cooling to 40° C., the resulting precipitate was added to 1000 grams of ice water containing 64 grams (0.4 mole) of 25% aqueous sodium hydroxide. After stirring at 25° to 30° C. for 1 hour, the precipitate was collected by filtration, washed with water until the washings were neutral to litmus and air dried at 45° C. The product, melting point 149–152° C., was obtained in 86.5% yield. After recrystallization of a sample from ethyl acetate, the 3-(2-benzothiazolyl)-2-benzothiazolinone melted at 159°–160° C. Vapor phase chromatographic analysis of the recrystallized sample gave only one peak. Analysis gave 9.71% nitrogen and 22.71% sulfur as compared to 9.85% nitrogen and 22.55% sulfur calculated for $C_{14}H_8N_2OS_2$. A molecular weight of 290 was found. The calculated molecular weight for $C_{14}H_8N_2OS_2$ was 284.4. The infrared spectrum was in agreement with the structure of 3-(2-benzothiazolyl)-2-benzothiazolinone. The same reaction was carried out in a medium of dimethylsulfoxide and comparable results were obtained.

3-(2-benzothiazolyl)-2-benzothiazolinone is a fungicide valuable for preventing attack by *Phytophthora infestans*, the cause of late blight on tomato plants. The method for testing this chemical was carried out in the following manner. 3 - (2 - benzothiazolyl)-2-benzothiazolinone was applied in a 0.1% concentration spray to the foliage of 4-week-old tomato plants. Twenty-four hours later inoculum in the form of zoospores of *Phytophthora infestans* was sprayed on the tomato plants. The plants were incubated for 24–48 hours in a constant temperature-humidity chamber, and transferred to a greenhouse where readings were made at appropriate times. 3-(2-benzothiazolyl)-2-benzothiazolinone receiving a rating of 1 for the severity of the disease on this test. A rating of 1 for the severity of the disease means that the disease was completely controlled.

It is intended to cover all modifications of examples chosen for purposes of disclosure which do not constitute departure from the spirit and scope of the invention.

We claim:
3-(2-benzothiazolyl)-2-benzothiazolinone.

References Cited by the Examiner
UNITED STATES PATENTS
3,050,526   8/1962   Lo _____ 260—306

OTHER REFERENCES
Elderfield: Heterocyclic Compounds, vol. 5 (New York, 1957), pages 547–552 and 562–566.
Horsfall: Principles of Fungicidal Action (Mass., 1956), page 210.
Tsurugi et al.: Kogyo Kagaku Zasshi, vol. 60, pages 362–5 (1957).

HENRY R. JILES, *Acting Primary Examiner*.
A. D. ROLLINS, *Assistant Examiner*.